US011006621B1

(12) United States Patent
Gehret et al.

(10) Patent No.: US 11,006,621 B1
(45) Date of Patent: May 18, 2021

(54) GLUE TRAP

(71) Applicant: Inventions 2000, Inc., Wyomissing, PA (US)

(72) Inventors: Michael J. Gehret, Wyomissing, PA (US); Paul M. Gehret, Wyomissing, PA (US); Frank M. Lesniak, Media, PA (US)

( * ) Notice: Subject to any disclaimer, the term of this patent is extended or adjusted under 35 U.S.C. 154(b) by 0 days.

(21) Appl. No.: 16/601,626

(22) Filed: Oct. 15, 2019

Related U.S. Application Data (60) Provisional application No. 62/748,578, filed on Oct. 22, 2018.

(51) Int. Cl.
| | |
|---|---|
| *A01M 23/02* | (2006.01) |
| *A01M 23/18* | (2006.01) |
| *A01M 23/00* | (2006.01) |
| *A01M 23/22* | (2006.01) |

(52) U.S. Cl.
CPC .......... *A01M 23/005* (2013.01); *A01M 23/02* (2013.01); *A01M 23/18* (2013.01); *A01M 23/22* (2013.01)

(58) Field of Classification Search
CPC ..... A01M 23/005; A01M 23/02; A01M 23/18
USPC ............................................ 43/114, 115, 116
See application file for complete search history.

(56) References Cited

U.S. PATENT DOCUMENTS

| | | | | |
|---|---|---|---|---|
| 2,962,836 | A | * 12/1960 | Hughes | ............... A01M 25/004 |
| | | | | 43/58 |
| 3,913,259 | A | * 10/1975 | Nishimura | .............. A01M 1/02 |
| | | | | 43/114 |
| 4,425,731 | A | 1/1984 | Orlando | |
| 4,438,584 | A | 3/1984 | Baker | |

(Continued)

OTHER PUBLICATIONS

Corrigan, Robert M., "The Efficacy of Glue Traps Against Wild Populations of House Mice, *Mus domesticus*, Rutty", Proceedings of the Eighteenth Vertebrate Pest Conference (University of Nebraska—Lincoln 1998); http://digitalcommons.unl.edu/vpc18/25.

*Primary Examiner* — David J Parsley
(74) *Attorney, Agent, or Firm* — Rogowski Law LLC (57) ABSTRACT

A glue trap for trapping vermin has a base flap and a cover flap formed by folding a cardboard sheet to create a folding hinge. At least one slot is formed in the cover flap at or near the fold line. A target surface of non-drying adhesive is installed on or over the upper surface of the base flap. Optionally, a target surface of non-drying adhesive is installed on or over the upper surface of the cover flap. In one embodiment, a tilt trigger having a bent angle shape has its first arm appended to the target and its second arm inserted into the slot opening of the cover flap, and in contact with the rear surface of the cover flap. The trap is installed with the base flap over a horizontal support surface and the cover flap disposed at an angle thereto and preferably in contact with a vertical surface, such as a wall. Vermin will stick to the adhesive and try to escape, causing a tilting motion of the tilt trigger and urging the cover flap to fold (Continued)

over the base flap and over the vermin caught on the target surface. In another embodiment, a riser is formed at the fold line creating the hinge of the trap. Movement of vermin caught by the adhesive moves the riser near the fold line downward, which causes the cover flap to fold over the base flap at the fold line.

21 Claims, 7 Drawing Sheets

(56) References Cited

U.S. PATENT DOCUMENTS

| | | | | |
|---|---|---|---|---|
| 4,959,924 | A | * 10/1990 | Martin | A01M 1/14 43/114 |
| 5,572,825 | A | 11/1996 | Gehret | |
| 5,634,293 | A | * 6/1997 | Mike | A01M 1/14 43/114 |
| 5,665,370 | A | 9/1997 | Gehret | |
| 5,673,509 | A | 10/1997 | Gatewood, Jr. | |
| 7,748,159 | B1 | * 7/2010 | Wenner | A01M 1/145 43/119 |
| 2006/0265941 | A1 | * 11/2006 | Newton | A01M 31/002 43/58 |
| 2012/0042562 | A1 | * 2/2012 | Liao | A01M 23/005 43/58 |

* cited by examiner

GLUE TRAP

CROSS-REFERENCE TO RELATED APPLICATION

This application claims priority under 35 USC § 119(e) to U.S. Provisional Application Ser. No. 62/748,578, entitled "Glue Trap", filed Oct. 22, 2018, the disclosure of which is incorporated by reference herein.

FIELD OF THE INVENTION

The present invention is generally directed to a glue trap for trapping vermin, such as rodents, insects and spiders.

BACKGROUND OF THE INVENTION

Glue traps, in general, are well known. There are glue traps having various ports, entrances and openings each positioned or designed to entice or fool the vermin into entering the trap, where once it has entered, the vermin is prevented in various ways from escaping.

Some disposable rodent traps comprise enclosures with adhesive or glue disposed therein to which an entering rodent will adhere. See, e.g., U.S. Pat. Nos. 4,425,731 and 5,673,509. Rodents are less apt to enter such trap enclosures, and generally approach such enclosures tentatively. This makes rodents less likely to be adhered to the glue, and more likely to detach themselves from such traps even if a portion of their body does come into contact with the glue.

Open trays of adhesive or glue are also proposed to trap rodents. See, e.g., U.S. Pat. No. 4,438,584. However, rodents adhered to the glue of such open trays take several days to expire, and throughout such time are open to view. Moreover, a percentage of rodents caught by open adhesive tray traps are able to separate from the traps by leverage obtained upon gaining contact with floor or wall surfaces that are not coated with adhesive.

Accordingly, improvements to glue traps continue to be sought.

BRIEF SUMMARY OF THE INVENTION

In a first embodiment of the invention, a glue trap for trapping vermin, such as particularly mice, insects and spiders, has a base flap and a cover flap formed by folding a cardboard sheet lengthwise to create a folding hinge at the fold line. The base flap has an upper surface and a surface opposite to the upper surface, and the upper surface of the base flap is coated with a slippery coating, such as silicone. The cover flap is configured to fold over the base, and defines a slot opening. In one embodiment, the slot opening is at or near the folding line. Preferably, the front surface of the cover flap is also covered with a slippery coating, such as silicone.

A target is installed over the upper surface of the base. The target has a target surface and a surface opposite to the target surface. A substantial portion of the target surface is coated with a non-drying adhesive or glue. Prior to installing the trap, the target surface may be covered with a removable facing or release paper.

A tilt trigger has a first arm and a second arm with an angle formed between the first arm and the second arm. For example, the tilt trigger may have a cross-section of a L-shape or a V-shape. The first arm of the tilt trigger is appended to the target, such as to the opposite or bottom surface of the target. The second arm of the tilt trigger is inserted into the slot opening of the cover flap, and contacts the rear surface of the cover flap.

The trap is installed with the base flap over a floor or other horizontal support surface and the cover flap disposed at an angle thereto and preferably in contact with a vertical surface, such as a wall. The target is installed over the base flap. When vermin, such as a mouse, contacts the target surface of the target of the trap, it will adhere to the non-drying adhesive or glue. Contact with the target surface moves the target causing a tilting motion of the tilt trigger, and the tilt trigger thus urges the cover flap to fold over the base flap and over the vermin caught on the target surface.

In a second embodiment of the glue trap, a cover flap is hingedly connected to a base flap at a fold line, along which is formed one or more elongated slots. Risers at the sides of the slot(s) raise the base flap up from the supporting surface on which the base flap is installed. The base flap has a target surface onto which is applied a non-drying adhesive or glue. Preferably, the cover flap has a target surface onto which is applied a non-drying adhesive or glue. Before the trap is installed, each target surface is covered by a removable facing or release paper. The glue trap is installed adjacent to a vertical support, such as a wall, with the opposite surface of the cover flap contacting or close to the wall, and with the base flap supported by the floor. When a vermin, such as a mouse, sticks to the target surface of the base flap, the weight or movement of the vermin moves the bottom or base flap downward, causing the hinged connection to fold and the cover flap to fold over the base flap, trapping the vermin.

Optionally, the cover flap is held in open configuration (before folding over the base flap) by a pillar, which has one pillar end in contact with the target surface of the base flap and the opposite pillar end in contact with the face surface of the cover flap, preferably outside of the target surface of the cover flap. The pillar may be formed by a strip joined to an edge of the cover flap by a tearable connection. Such strip may be disconnected from the cover flap and installed to hold the glue trap cover flap open as described herein. Vibrations or movement of vermin caught in the target surface of the base flap are sufficient to dislodge the pillar, allowing the cover flap to fold over the base flap, trapping the vermin.

Optionally, the cover flap has an overhang formed by folding the blank along a widthwise extending fold line spaced apart from the top edge of the blank. The opposite pillar end may then be in contact with the overhang when the pillar is installed to hold the glue trap cover flap open as described herein.

In another aspect of the invention, a blank for making a glue trap is provided, wherein the same blank may be used to create either a glue trap having a flat trap configuration or a glue trap having a hinged trap configuration. The blank is a rectangular sheet with a front surface and an opposite surface, a top edge and a bottom edge, and two side edges. The blank may be of a card stock or cardboard. A substantial portion of the front surface is coated with a slippery coating, such as a silicone coating. Preferably, the entire front surface is coated with a slippery coating, such as a silicone coating. A first fold line is disposed lengthwise in the blank at a location spaced apart from one of the side edges. A second fold line is disposed widthwise in the blank at a location spaced apart from the bottom edge. A first target surface on the front surface of the blank is covered with a non-drying adhesive or glue. A second target surface on the front surface in a region spaced apart from the first target surface is covered with a non-drying adhesive or glue. The non-drying adhesive or glue of the second target surface may be the same composition or a different composition from the non-drying adhesive or glue of the first target surface. Preferably, at least one removable facing sheet covers the non-drying adhesive or glue on the first target surface and the second target surface.

When the blank is folded at the first fold line (lengthwise fold), the trap formed with the blank may be positioned adjacent to the wall with both the first target surface and second target surface exposed to trap vermin running along the wall. When the blank is folded at the second fold line (widthwise fold), the trap formed with the blank has a cover flap and a base flap, wherein the base flap is supported on a floor or support surface and the cover flap is hingedly connected thereto and folds over vermin that has stuck to the first target surface.

The blank may include a tear strip joined to the top edge of the blank by a tearable connection. The tear strip when separated from the blank may be used as a pillar to hold a cover flap open and above a base flap when the blank is folded at the second fold line. The blank may have at least one cut out along the second fold line disposed widthwise, and slits from each side edge that are parallel to and spaced apart from the second fold line. The blank also may include a third fold line disposed widthwise at a location spaced apart from a top edge. When folded at the third fold line, a cover flap of the trap has an overhanging edge.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings embodiments of glue traps which are presently preferred. It should be understood, however, that the disclosure is not limited to the precise arrangements and instrumentalities shown. In the drawings.

DESCRIPTION OF THE DISCLOSURE

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1:
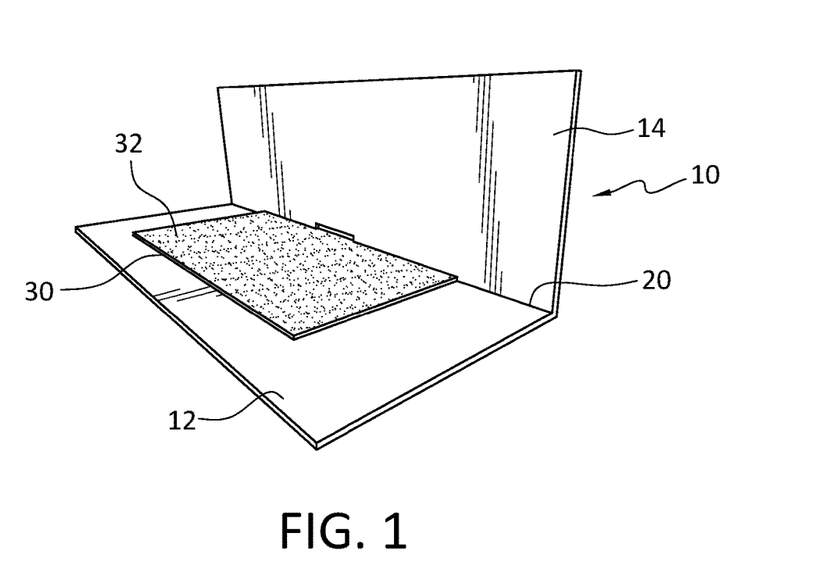
FIG. 1 is a perspective view of a glue trap according to a first embodiment of the invention.
Figure 2A:
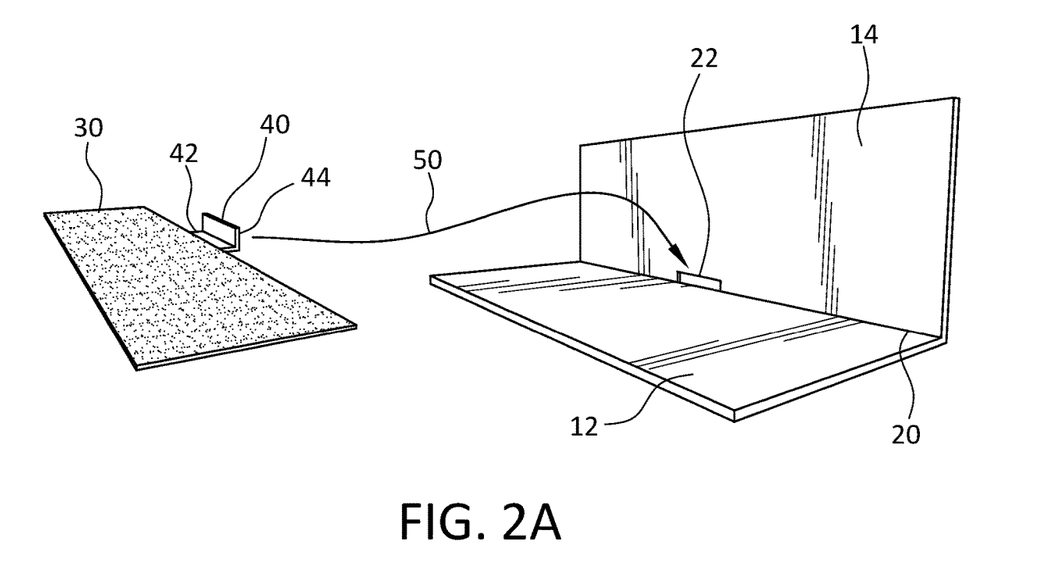
FIG. 2A is a perspective view of components of the glue trap of FIG. 1, namely, the glue target with trigger hinge and the silicone covered cardboard.
Figure 2B:
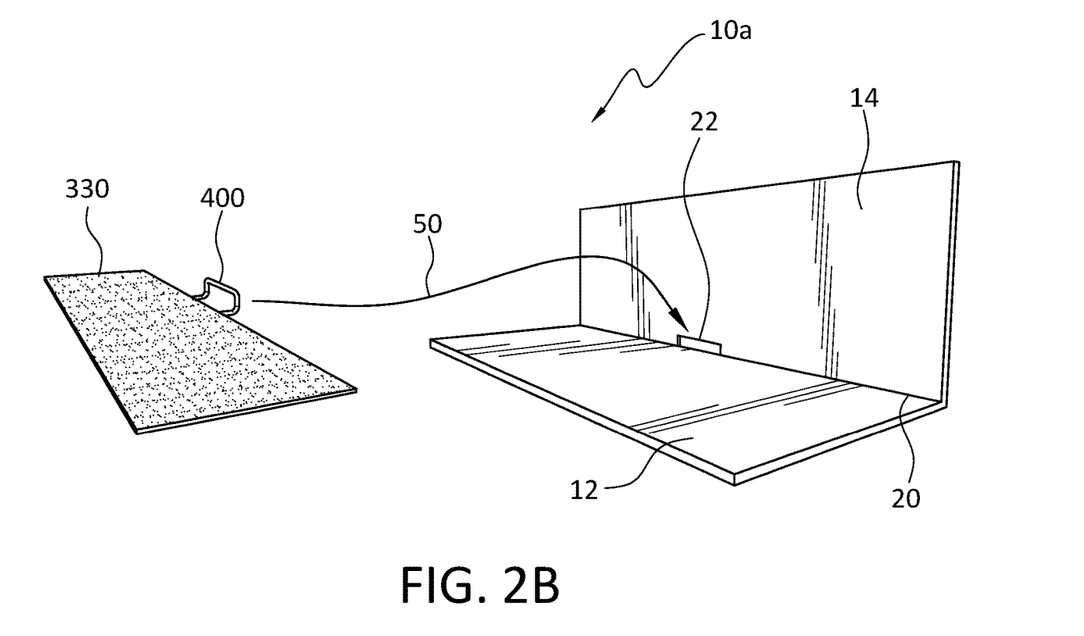
FIG. 2B is a perspective view of components of a variant of the glue trap of FIG. 1 showing the tilt trigger as a bent wire.
Figure 2C:
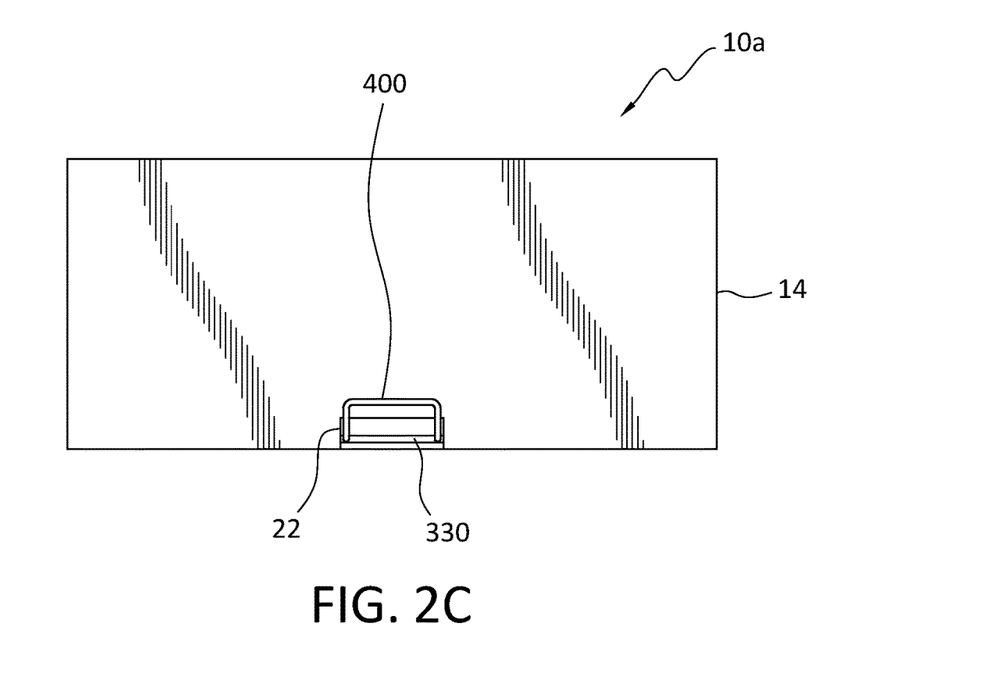
FIG. 2C is a rear elevational view of the glue trap of FIG. 2B with the tilt trigger installed inside the slot.
Figure 3:
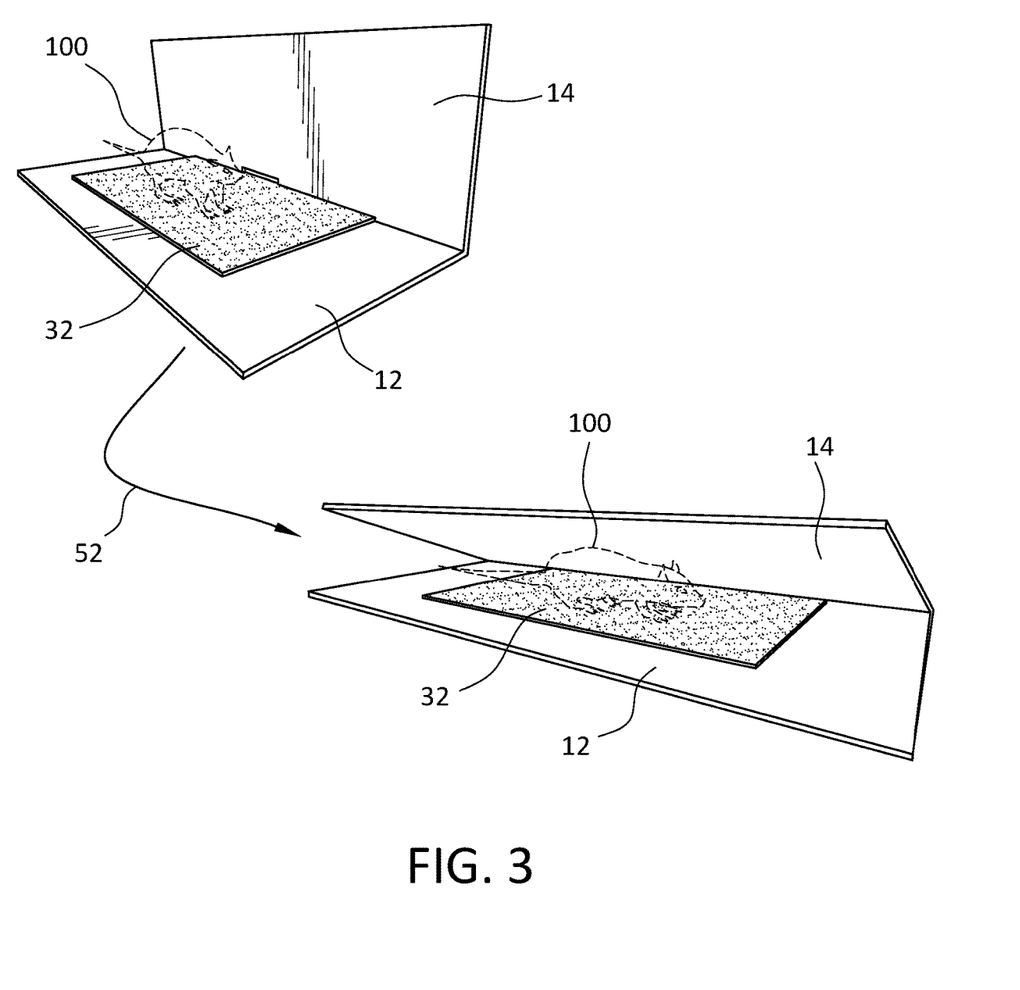
FIG. 3 is a perspective view of a mouse stuck to the glue target with the top flap of the silicone covered cardboard is open position, and a perspective view of the mouse within the glue trap after the top flap of the silicone covered cardboard has closed over the mouse in response to the trigger hinge action.

Referring first to FIGS. 1-3, a first embodiment of a glue trap 10 according to the invention is shown. The glue trap 10 includes a base flap 12 and a cover flap 14 created by folding a cardboard blank lengthwise. The cover flap 14 may be folded over the base flap 12 at the fold line 20. Preferably, the top surface of the base flap 12 and the front surface of the cover flap 14 are coated with a slippery coating, such as silicone. The slippery coating reduces the surface friction, making it more difficult for vermin, such as a mouse, to scratch or claw or grip the surface. Regions of the base flap 14 with slippery coating are indicated by reference 16.

A slot 22 is formed in the cover flap 14 preferably at or near the fold line 20. In the embodiment shown in FIGS. 1-3, the base flap 12 and the cover flap 14 have a same length, which preferably can be from about 6 inches to about 18 inches, preferably about 12 inches. The slot 22 preferably has a length from about 1 to about 3 inches, preferably about 1.5 to 1.75 inches, and a slot height of about ⅛ to ¼ inch. As shown in FIG. 1, the slot 22 is positioned spaced apart from the side edges of the base flap 12 and the cover flap 14.

A target sheet 30 has a target surface 32, which is its upper surface in FIGS. 1-3, and an opposite surface, which is its bottom surface. The target surface 32 is coated with a non-drying adhesive or glue that remains tacky to the touch. A representative non-drying adhesive is available under the brand CATCHMASTER from AP & G Co. Optionally, the adhesive or glue is covered by a removable facing sheet (not shown in FIGS. 1-3). A user may install the target sheet 30 into the trap 10 before exposing the adhesive or glue surface by removing the removable facing. In the embodiment of FIGS. 1-3, the target sheet 30 has a length that is shorter than the length of the base flap 12 and has a width that is shorter than the width of the base flap 12. In a preferred embodiment, where the base flap 12 has a length of 12 inches and a width of 4.5 inches, the target sheet 30 has a length of from about 4 inches to about 8 inches and a width of about 2.5 to 3.5 inches.

Alternatively, a layer of non-drying adhesive or glue may be applied directly to the target surface 32 of the base flap 12.

A tilt trigger 40 has a bent angle shape, such as an L-shape or a V-shape. One arm 42 of the tilt trigger 40 is appended to the opposite surface of the target sheet 30. The second arm 44 of the tilt trigger 40 is inserted into the slot 22 in the cover flap 14. When so inserted as indicated by arrow 50 in FIG. 2A, the second arm 44 contacts the opposite or back surface of the cover flap 14. See FIG. 3. The tilt trigger 40 may be formed of a polymer, preferably a thermosetting polymer such as polystyrene. Alternatively, the tilt trigger may be formed of a bent wire. In a preferred embodiment, the tilt trigger 40 comprises an L-shaped molded polystyrene part with each arm having a length of about ¼ to ½ inch and having a width shorter than the length of the slot 22.

In a variant of the glue trap 10a shown in FIGS. 2B and 2C, the tilt trigger 400 is formed as a bent wire that is secured to the target sheet 330. The tilt trigger 400 is inserted into the slot 22 in the hinge 20 so that a portion of the bent wire contacts the opposite or back surface of the cover flap 14.

Preferably, the glue trap 10 is installed with the base flap 12 on a floor surface and the cover flap 14 disposed vertically, e.g., angled about 80-110 degrees from the top surface of the base flap 12. The top surface of the base flap 12 should be located at an area close to a wall where vermin are expected to travel. The rear surface of the cover flap 14 may contact the wall, and thereby be supported by the wall before the tilt trigger 40 urges the cover flap 14 to fold over the base flap 12.

Vermin, such as a mouse 100 as shown in FIG. 3, will traverse over the top surface of the base flap 12, and onto the target surface 32 of the target sheet 30. The mouse 100 adhesively is held onto the target surface 32. The slippery surface of the base flap 12 surrounding the target sheet 30 impedes the mouse 100 from securing hold by scratching or clawing or biting to try to release itself from the trap 10. Moreover, movement of the mouse 100 while stuck on the target surface 32 vibrates or moves the target sheet 30. As a result of such movement, the tilt trigger 40 causes the cover flap 14 to fold over the base flap 12 and over the mouse 100 held in the trap. Arrow 52 in FIG. 3 indicates the change in the trap condition from when the mouse 100 first impacts the target surface 32 to when the cover flap 14 folds over the mouse 100 and the base flap 12.

Figure 4:
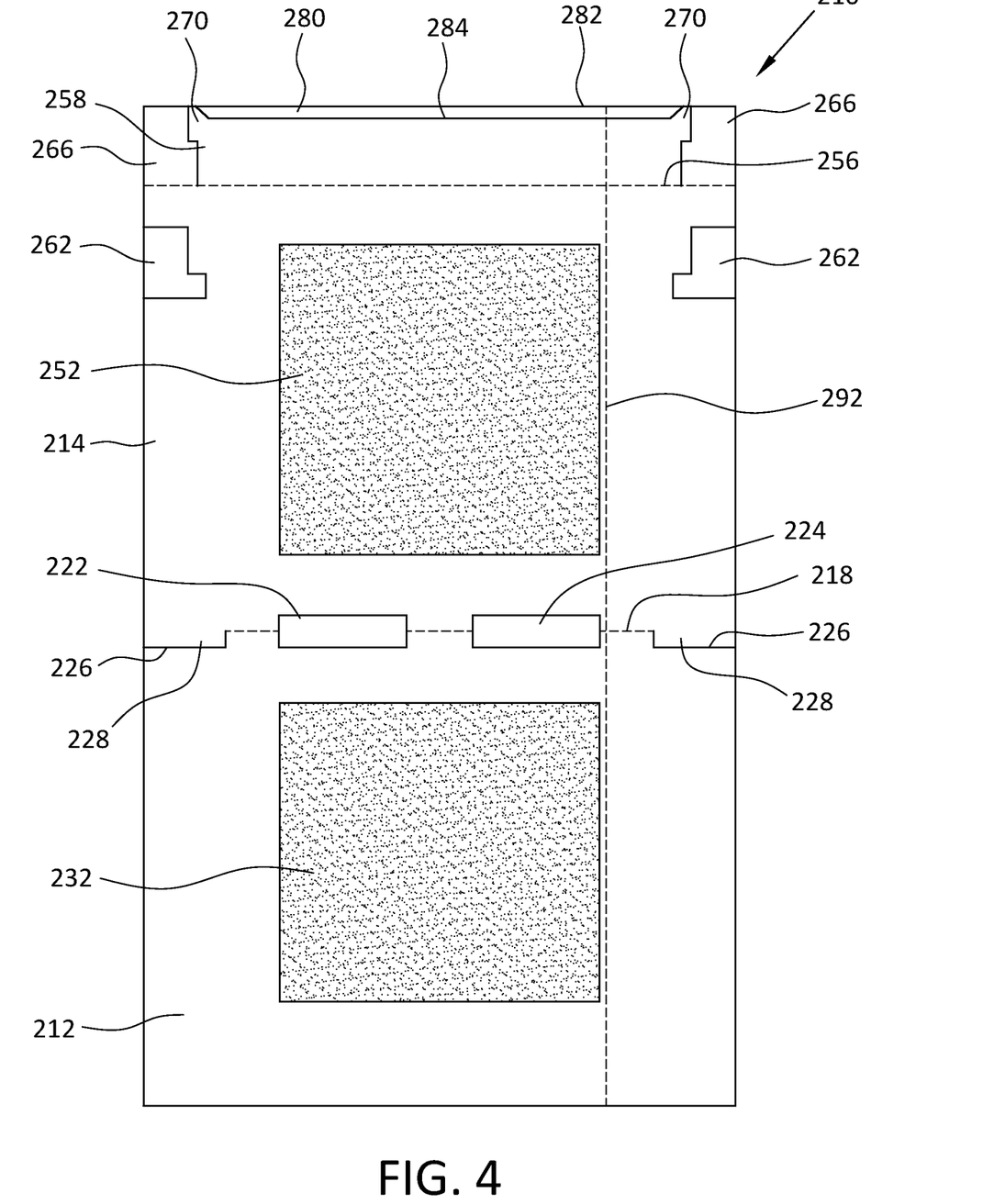
FIG. 4 is a diagram of a blank for forming a glue trap according to a second embodiment of the invention, which shows location of the cut lines, fold lines and target surfaces on card stock to create the glue trap.

Referring next to FIGS. 4-8, another alternative embodiment of a glue trap 210 is shown. In FIG. 4, a blank for the glue trap 210 is formed of a card stock that is coated with a slippery coating, such as silicone. The blank illustrated in FIG. 4 shows the dimensions for the base flap 212 and the cover flap 214 and the target surfaces 232, 252 on the base flap 212 and the cover flap 214, respectively, to which non-drying adhesive or glue is applied. The blank also illustrates the dimensions for the first slot 222 and second slot 224 in the hinge fold 220 across the width of the card stock, and the location of another fold line 256 spaced apart from the top edge of the cover flap 214 to create a folded edge 258.

In this embodiment, two slots 222 and 224 are formed by cutting out material at the fold line 218. Slits 226 are cut into the blank at the side edges along a line generally parallel to and spaced apart from the fold line 218. In a preferred embodiment, the slits 226 are about 1 inch long and spaced apart from the fold line 218 about ⅛ inch to create a riser 228 at each of the sides of the slots 222, 224. When the glue trap 210 is installed with the cover flap 214 folded over the base flap 212 at the fold line 218 creating a hinge 220, and with the base flap 212 supported on a support surface, such as a floor surface, the risers 228 lift the base flap 212 off of the support surface. See FIGS. 5, 6 and 8. When vermin, such as a mouse 100, sticks to the target surface 232 on the base flap 212, the weight and/or movement of the vermin moves the base flap 212 supported by the risers 228 downward, causing the cover flap 214 to fold down over the base flap 212 at the hinge fold 220 along which the slots 222, 224 are positioned. See FIG. 7.

Figure 5:
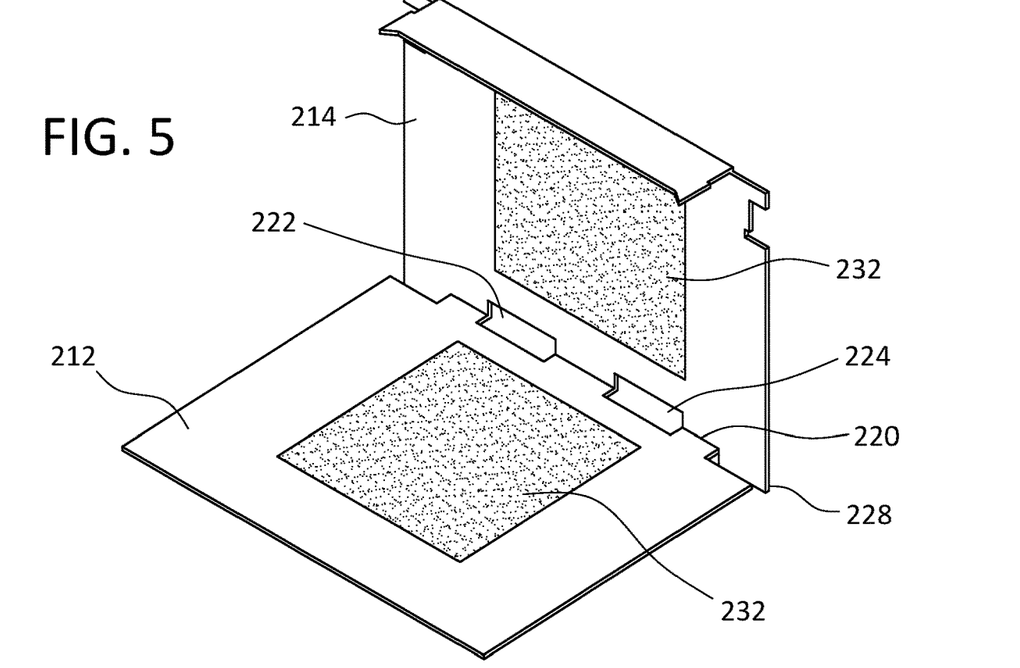
FIG. 5 is a perspective view of the glue trap formed with the blank of FIG. 4 shown in a first glue trap configuration.

The blank of FIG. 4 identifies portions 262, 266 to be cut out of the cover flap 214 to create a folded overhang 258 at or near the top edge of the cover flap 214. FIG. 5 shows the glue trap 210 installed with the base flap 212 supported by a support surface, such as a floor, and the cover flap 214 hingedly connected to the base flap 212 at hinge fold 220 along which the slots 222, 224 are disposed. The folded overhang 258 is spaced away from the base flap 212 and the side tabs 270 at the top edge of the cover flap 214 may be inserted into notches 262 formed by removing material from the blank at the side edges of the cover flap 214. Folded overhang 258 also hides the vermin (mouse) when the vermin is captured in the trap.

In environments in which there are significant vibrations along the wall onto which the opposite surface of the cover flap 214 is in contact, or along the support surface onto which the base flap 212 is supported, the glue trap 210 may prematurely trigger or close even when vermin has not been caught in the trap. To address this, the cover flap 214 may be supported in an open position by an extra support.

Figure 6:
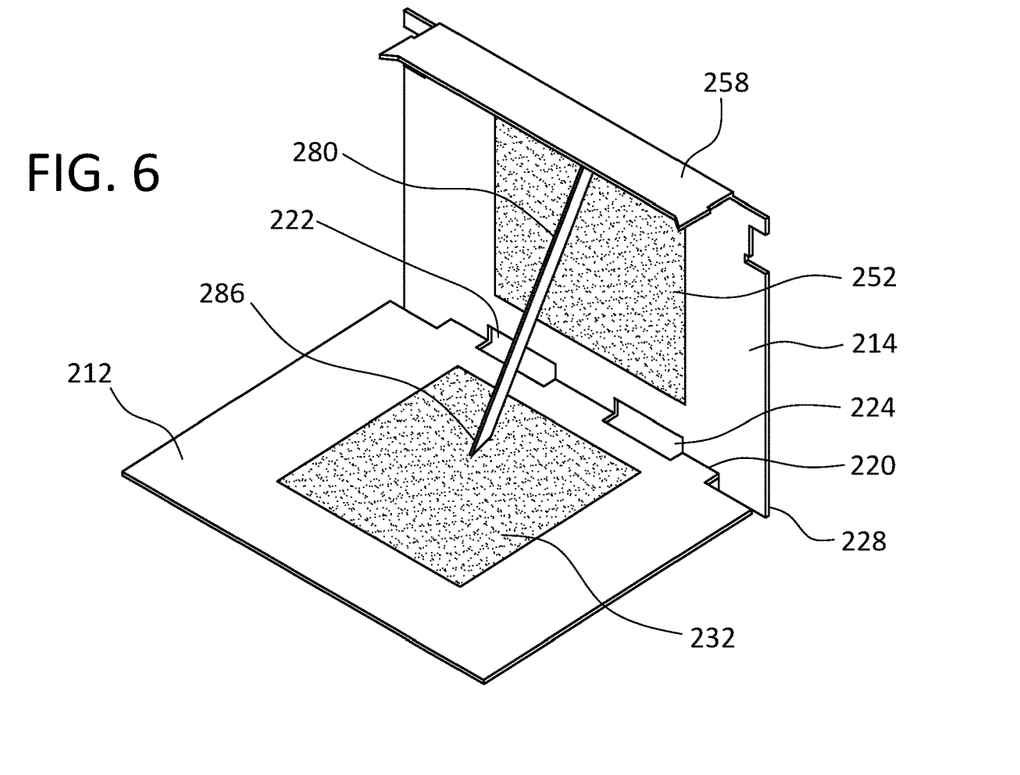
FIG. 6 is a perspective view of the glue trap formed with the blank of FIG. 4 shown in a second glue trap configuration with a support pillar installed.
Figure 7:
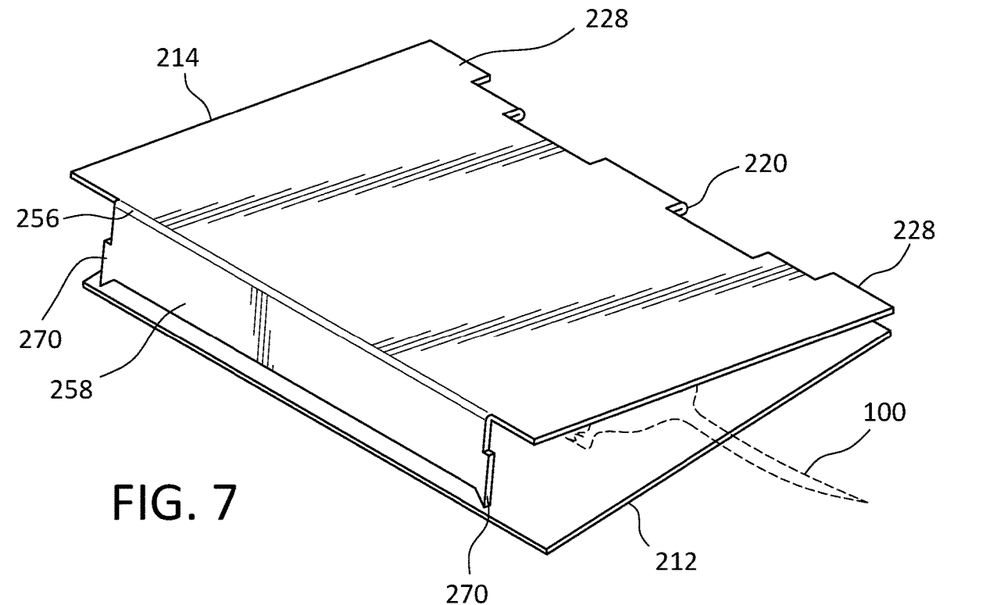
FIG. 7 is a perspective view of the glue trap of FIG. 5 with a mouse stuck to the glue targets of the glue trap.
Figure 8:
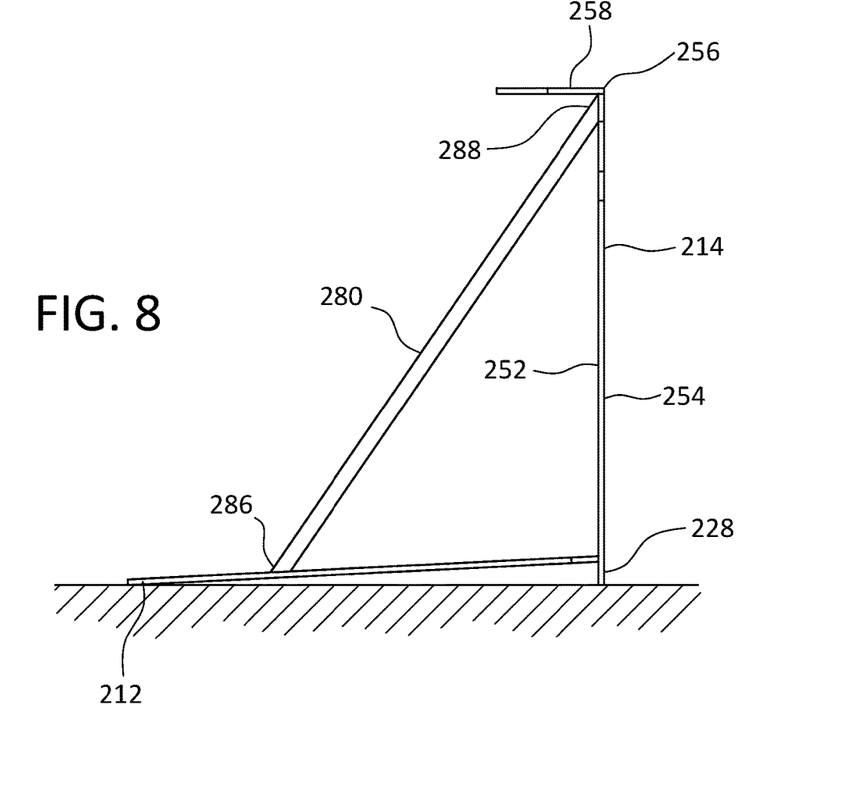
FIG. 8 is a side elevational view of the glue trap formed with the blank of FIG. 4 shown in the second glue trap configuration with a support pillar installed.

One optional extra support structure (a pillar 280) is illustrated in FIGS. 6 and 8. In FIG. 4, a tear strip 282 at a top edge of the cover flap 214 of the glue trap 210 can be separated from the cover flap 214 at the tear-able connection 284 to make the pillar 280 that can be used to support the cover flap 214 when the glue trap is installed with the cover flap 214 disposed vertically at an angle from about 80 to 110 degrees in relation to the base flap 212 when the glue trap is folded at fold line 218. See FIGS. 6 and 8 showing the glue trap 210 installed with the cover flap 214 open and supported by the pillar 280, with a first end 286 of the pillar 280 in contact with the target surface 232 of the base flap 212 and the second end 288 of the pillar 280 in contact with the overhang 258 of the cover flap 214. When vermin, such as a mouse 100, gets stuck to the target surface 232 of the base flap 212, the vermin will attempt to extract itself from the target surface 232 and will knock down the pillar 280, while also causing the base flap 212 supported by the risers 228 to move downward and effecting closure of the cover flap 214 over the base flap 212 at the hinge fold 220 at the slots 222, 224. By such closure, the trapped vermin contacts also the target surface 252 of the cover flap 214, making it more difficult for the trapped vermin to escape from the glue trap 210.

Figure 9:
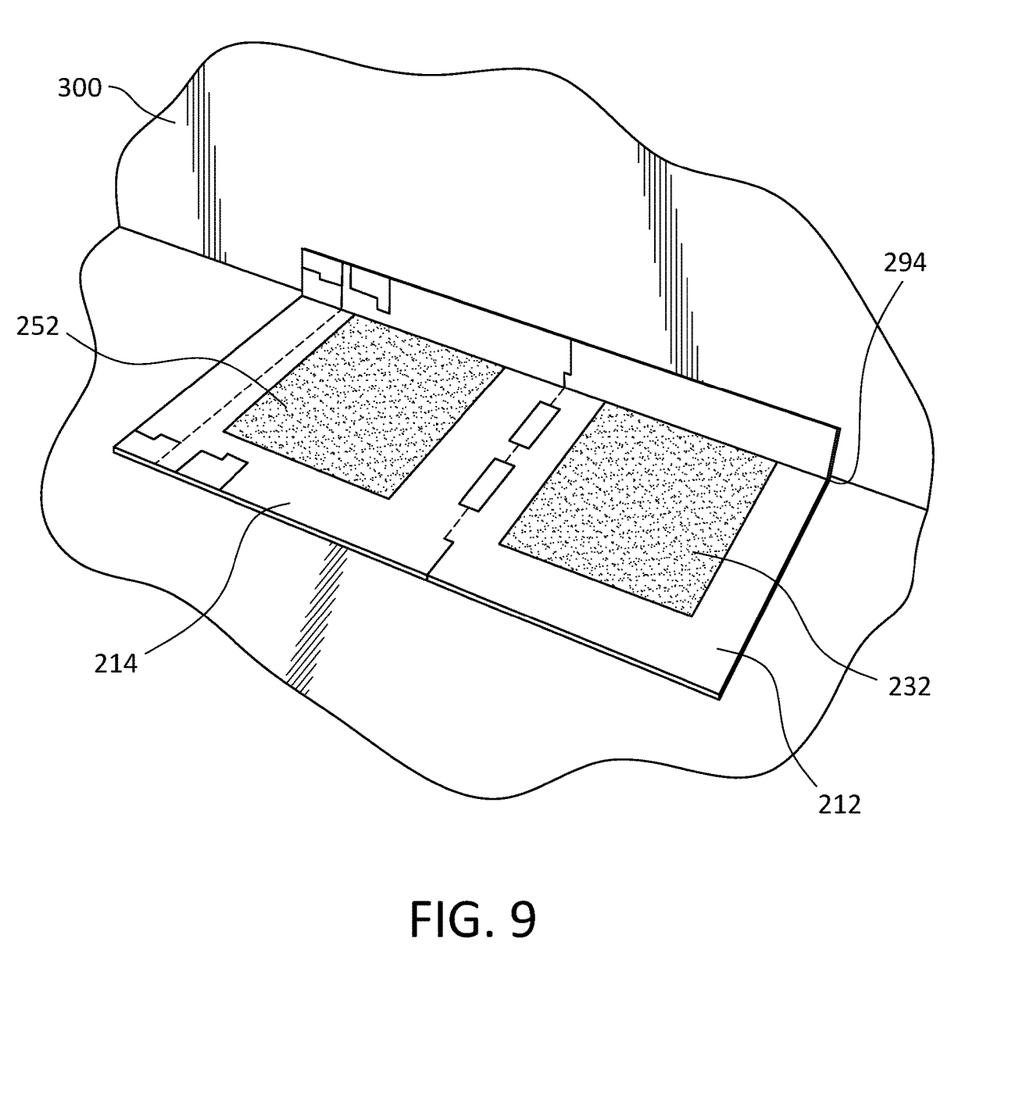
FIG. 9 is a perspective view of the glue trap formed with the blank of FIG. 4 shown in a third glue trap configuration.

Some users may prefer installing a glue trap in a flat configuration, without having a cover flap that folds over a base flap. The blank for the glue trap 210 shown in FIG. 4 includes an alternate fold line 292 disposed lengthwise along the length of the blank and spaced apart from one of the side edges. The side edge of the blank may be folded upwardly at alternate fold line 292. To establish a guide corner 294 at the fold for placing the glue trap on a support surface with the opposite surfaces 234, 254 of the base flap 212 and cover flap 214 in contact with the support surface, and with the guide corner 294 along a baseboard or along a bottom edge of a building wall 300. See FIG. 9.

In known glue traps, the adhesive is merely relied upon to catch and hold the vermin. Often, however, the vermin is able to free itself from the adhesive by contacting and grasping a surface proximal to the adhesive thereby forming a hold with that surface and consequently freeing itself from engagement with the glue. It has been found that providing a slippery surface surrounding the adhesive or glue impedes the vermin's ability to pull free from the adhesive. Moreover, it has been found that having a cover flap fall over and onto the vermin caught by the adhesive/glue improves effectiveness of the trap and further impedes the vermin's ability to pull free from the adhesive. Particularly effective engagement of the vermin is made where adhesive/glue is present on both the base flap and the cover flap.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

The invention claimed is:

1. A glue trap for trapping vermin, comprising:
    a base flap having an upper surface and a surface opposite to the upper surface, wherein the upper surface is coated with a slippery coating;
    a target installed over the upper surface of the base, the target having a target surface and a surface opposite to the target surface, wherein a substantial portion of the target surface is coated with a non-drying adhesive or glue;
    a cover flap configured to fold over the base, wherein the cover flap has a front surface and a rear surface opposite the front surface, a top edge and a bottom edge forming a fold with the base, the cover flap defining at least one slot opening therein;
    a tilt trigger having a first arm and a second arm with an angle formed between the first arm and the second arm, wherein the first arm is appended to the target and the second arm is inserted into the slot opening of the cover flap and contacts the rear surface of the cover flap.

2. The glue trap of claim 1, wherein the tilt trigger has an L-shape or V-shape in cross-section.

3. The glue trap of claim 1, wherein the tilt trigger comprises a polymeric resin.

4. The glue trap of claim 1, wherein the tilt trigger is a bent wire.

5. The glue trap of claim 1, wherein at least a portion of the front surface of the cover flap is coated with a non-drying adhesive or glue.

6. The glue trap of claim 1, wherein the slippery coating comprises silicone.

7. The glue trap of claim 1, wherein the front surface of the cover flap is coated with a slippery coating.

8. The glue trap of claim 1, wherein at least a portion of the front surface of the cover flap is coated with a non-drying adhesive or glue.

9. The glue trap of claim 1, wherein the non-drying adhesive or glue is covered by a removable facing sheet.

10. A glue trap for trapping vermin, comprising:
    a base flap having an upper surface and a surface opposite to the upper surface, wherein the upper surface is coated with a slippery coating;
    a target surface installed over or on the upper surface of the base, wherein a substantial portion of the target surface is coated with a non-drying adhesive or glue;
    a cover flap configured to fold over the base, wherein the base flap and cover flap are formed from a single cardboard sheet that is folded forming a hinge;
    at least one slot opening through the hinge; and
    a first riser at a bottom edge of the cover flap spaced apart from the at least one slot opening and a second riser at the bottom edge of the cover flap spaced apart from the at least one slot opening and spaced apart from the first riser, wherein the first riser and the second riser together lift the hinge and a portion of the base opposite surface above a supporting surface for the glue trap.

11. The glue trap of claim 10, further comprising a pillar supporting the cover flap in an open orientation not substantially folded over the base flap.

12. The glue trap of claim 11, wherein the pillar has a first end in contact with the target on the base flap and a second end in contact with a front surface of the cover flap.

13. The glue trap of claim 11, wherein the pillar has a first end in contact with the target on the base flap and a second end in contact with an overhang of the cover flap.

14. The glue trap of claim 10, further comprising a tear-away strip separable from the cover flap and, when separated from the cover flap configured to form a pillar supporting the cover flap in an open orientation not substantially folded over the base flap.

15. The glue trap of claim 10, further comprising multiple slots and multiple risers, wherein each slot opening has a riser on each side thereof.

16. The glue trap of claim 10, wherein the cover flap has a front surface and a surface opposite the front surface, and the front surface of the cover flap is coated with a slippery coating.

17. The glue trap of claim 10, wherein at least a portion of the front surface of the cover flap is coated with a non-drying adhesive or glue.

18. The glue trap of claim 10, wherein the non-drying adhesive or glue is covered by a removable facing sheet.

19. A blank for a glue trap having a flat trap configuration and a hinged trap configuration, comprising:
    a rectangular sheet with a front surface and an opposite surface, a top edge and a bottom edge, and two side edges, wherein a substantial portion of the front surface is coated with a slippery coating;
    a first fold line disposed lengthwise at a location spaced apart from one of the side edges;
    a second fold line disposed widthwise at a location spaced apart from the bottom edge;
    at least one cut out along the second fold line disposed widthwise;
    a first slit through the sheet from one side edge that is spaced apart from and parallel to the second fold line;
    a second slit through the sheet from the other of the side edges of the sheet that is spaced apart from and parallel to the second fold line and substantially in line with the first slit;
    a first target surface on the front surface that is covered with a non-drying adhesive or glue;
    a second target surface on the front surface in a region spaced apart from the first target surface, wherein the second target surface is covered with a non-drying adhesive or glue; and
    at least one removable facing sheet covering the non-drying adhesive or glue on the first target surface and the second target surface.

20. The blank of claim 19, further comprising a tear strip joined to the top edge of the blank by a tearable connection.

21. The blank of claim 19, further comprising a third fold line disposed widthwise at
    a location spaced apart from a top edge.

* * * * *